US005132521A

United States Patent [19]

Smith et al.

[11] Patent Number: 5,132,521

[45] Date of Patent: Jul. 21, 1992

[54] SYSTEM AND METHOD FOR ACQUISITION AND ENCODING OF ATM CARD DATA

[76] Inventors: Charles M. Smith, 917 Rebel Cir.; DeWitt A. Bennett, 609 Hunt Ct., both of Franklin, Tenn. 37064; Brenda J. Johnson, 5353 Village Way, Nashville, Tenn. 37211; Edward A. Rappuhn, 113 Laird Rd., Nashville, Tenn. 37205; William S. Dinker, 110 N. Berwick La., Franklin, Tenn. 37064

[21] Appl. No.: 407,541

[22] Filed: Sep. 15, 1989

[51] Int. Cl.$^5$ .......................... G06K 5/02; G06K 9/03

[52] U.S. Cl. .................................... 235/382; 235/379; 902/5

[58] Field of Search ............... 235/379, 375, 380, 382; 902/4, 5

[56] References Cited

U.S. PATENT DOCUMENTS

| | | | |
|---|---|---|---|
| 3,996,450 | 12/1976 | Kerkhoff | 235/380 |
| 4,023,014 | 5/1977 | Goldberg | 235/380 |
| 4,138,057 | 2/1979 | Atalla | 235/380 |
| 4,614,861 | 9/1986 | Pavlov et al. | 235/380 |
| 4,636,947 | 1/1987 | Ward | 364/200 |
| 4,760,245 | 7/1988 | Fukaya | 235/379 |
| 4,761,542 | 8/1988 | Kubo et al. | 235/379 |
| 4,837,422 | 6/1989 | Dethloff et al. | 235/379 |

FOREIGN PATENT DOCUMENTS

| | | | |
|---|---|---|---|
| 8803294 | 5/1988 | PCT Int'l Appl. | 235/380 |

*Primary Examiner*—Stuart S. Levy
*Assistant Examiner*—Richard Weinberg

[57] ABSTRACT

A system and method which allows an individual customer to select his or her own personal identification number for an ATM card through use of a telephone line. The system generally comprises a voice response unit linked to both existing telephone networks and a card encoding/embossing unit. The voice response unit is interactive to allow the acquisition and storage of data to be encoded. The system voice prompts, stores, and voice confirms the client identification data and transaction order number to the customer representative. The system then voice prompts, stores, and voice confirms to the customer his or her chosen PIN outside the range of perception of the customer representative. The system receives the requested PIN and combines it with the existing client data base. The system generates the initial encoding data and enters the data into the database. The appropriate transaction order number in the voice response unit is located, and the selected PIN is accessed. The PIN is incorporated into the encoding database using the existing client PIN encryption algorithm to calculate the PIN offset. The encoding data base is transmitted to the card embossing the encoding machine for production of the ATM card.

10 Claims, 6 Drawing Sheets

*DATA FLOW FOR TELEPHONE PIN SELECTION*

SYSTEM AND METHOD FOR ACQUISITION AND ENCODING OF ATM CARD DATA

BACKGROUND OF THE INVENTION

The present invention relates to systems and methods for the acquisition and magnetic encoding of data on credit, debit, and account access cards used in conjunction with automated teller machines (ATM) and point of sale (POS) machines. More specifically, the present invention involves the use of an interactive voice response system to automate the selection of personal identification numbers (PIN) and encoding of PIN offsets which are necessary features of conventional ATM cards and networks. As a matter of convenience, references herein to ATM cards will also include POS, credit, and debit cards.

Localized and interconnected ATM networks have become a prominent feature of the consumer banking industry. Similarly, point of sale (POS) machines for authorization of debit and credit card transactions are increasingly found in retail establishments. In either case, the ATM and POS machine industries have adopted uniform standards for identifying the user and user account number by encoding alphanumeric data on a magnetic "stripe" placed on the ATM card itself. Encoding can also be accomplished by use of memory chips, as with a "smart" or "chip" card, or optically for use with optically read cards. Access to the ATM machine and user account is controlled by use of a PIN that, in conjunction with the account number, is unique and confidential to the user.

Typically, the PIN is a combination of four numerals that are either selected by the user at the time the account is opened or are algorithmically generated by the independent ATM card issuer. Those familiar with the ATM industry realize that many users prefer to select their own PIN in order to improve their ability to remember it for future use.

Generally, there are three basic methods used today for PIN selection and encoding. In one, the new ATM card user is asked to "confidentially" write down, or instruct the bank customer service representative to write down, the desired PIN, which is then delivered to an in-house or independent ATM card encoding and embossing facility. This method creates an undesirable hard copy of the PIN selection and increases the number of personnel having access to the PIN. These two factors increase the risk of unauthorized card/PIN use. In the second method, the customer is asked to use an ATM itself to select and transmit the desired PIN to the bank's data processing facility. This can be awkward and inconvenient if, for example, the customer is unfamiliar with ATM operation, if an outside ATM machine, the weather is poor, or if the ATM is not on-line.

In the third known method, the bank itself will provide the customer with direct access to an on-site card encoding/PIN selection system. This is not preferred because of the large capital investment and training required by the bank in providing such systems for each of its locations.

What is needed, then, is a convenient and low cost system and method whereby a bank can provide its ATM customers with direct yet remote, interactive, and confidential access to an ATM card encoding/embossing facility, such that the customer may select a preferred PIN and cause the automatic encoding of a PIN offset without the creation of unnecessary documentation and involvement of additional personnel or equipment.

SUMMARY OF THE INVENTION

The system and method employed by the present invention combine a conventional ATM card encoding and embossing machine, a microprocessor based means for controlling the encoding/embossing machine, and an interactive voice response unit for acquisition and storage of data to be encoded. Preferably, the hardware will be remotely located from the bank facility, usually at the site of an independent ATM card issuing entity. The novel steps of the present method are implemented by the system hardware, as directed by customized application software associated with the processors of the system. In general terms, the system automatically performs the operations and routines of the present method as follows:

1. Voice prompt, store, and voice confirm to the bank customer service representative the desired bank client identification data and transaction number;
2. Voice prompt, store, and voice confirm to the bank's ATM customer the desired PIN;
3. Receive ATM card request transaction data separately provided by the bank client and combine with existing client database;
4. Generate initial ATM card encoding data and enter into encoding database;
5. Locate matching transaction order number in voice response unit database and access corresponding bank customer selected PIN;
6. Using existing bank client PIN encryption algorithm, calculate PIN offset and copy into encoding database; and
7. Transmit encoding database to card embossing and encoding machine for production of ATM cards.

An object of the present invention, then, is to provide a system and convenient method for remote acquisition and encoding of ATM card data.

Another object of the present invention is to implement an ATM card encoding system that allows for the confidential selection of the ATM card PIN by the bank customer from a remote location.

A further object of the present invention is to provide an ATM card data encoding system that is voice interactive and user friendly.

Yet another object of the system and method of the present invention is to minimize the intervention of personnel in the ATM card data selection and encoding process.

DESCRIPTION OF THE PREFERRED EMBODIMENT

The system of the present invention generally comprises two microprocessor controlled hardware subsystems, each functioning under the guidance of its own application software. The first subsystem or unit performs the functions of interactive voice prompting, acquisition, and voice confirming of alphanumeric data provided by conventional telephone link to a remotely located bank customer and customer service representative. A preferred embodiment of such a unit, to be referred to herein as the voice response unit (VRU) 2 is shown on FIG. 1. The second subsystem receives information separately provided by the bank clients and, using data transmitted by VRU 2, implements the matching, PIN offset generating, and card encoding-/embossing functions of the system. A preferred embodiment of the second unit, referred to herein as the card encoding/embossing unit (CEU) 20 is shown on FIG. 2.

Preferably, both the VRU 2 and CEU 20 are located together at the ATM card issuing facility, joined by a standard RS-232 asynchronous serial I/0 interface. A preferred embodiment of VRU 2 will have the capability of receiving and processing data simultaneously through thirty-two (32) telephone ports, such as would be needed for ATM card issuing entities serving multiple bank clients.

Figure 1:
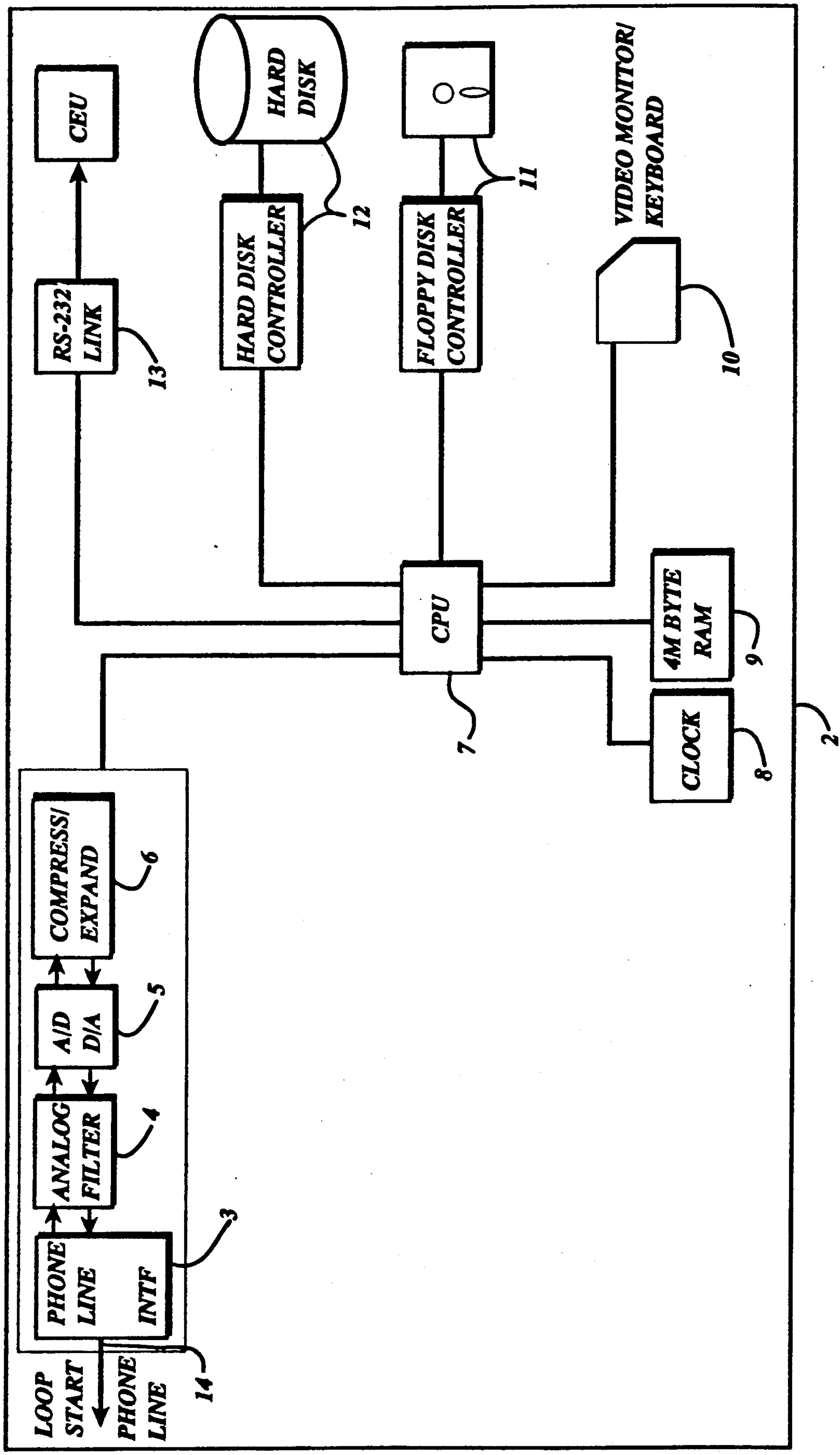
FIG. 1 is a block diagram representation of the voice response unit (VRU) portion of the system.
Figure 2:
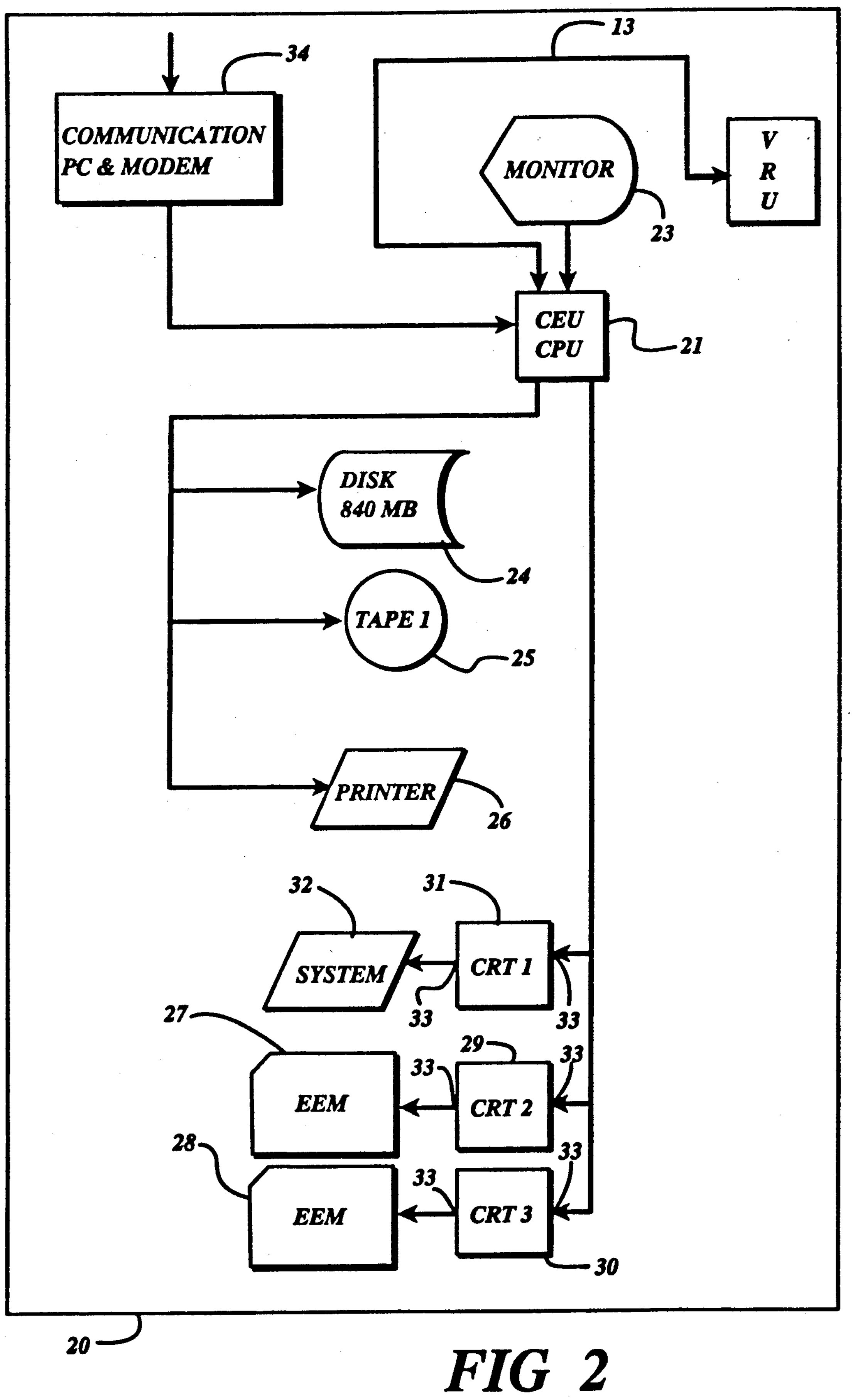
FIG. 2 is a block diagram representation of the card encoding/embossing unit (CEU) portion of the system.

The particular hardware components selected for use in VRU 2 are conventional in nature and can vary depending on the particular requirements of the user. FIG. 1 shows a preferred embodiment of VRU 2 that will serve the needs of most facilities involved in the encoding, embossing, and issuing of ATM cards. VRU 2 will link up to existing telephone networks by means of line interface 3, followed by analog filter 4 which minimizes transmission of extraneous noise and unwarranted transients. The analog signals are then transmitted to analog to digital converter (ADC) 5. ADC 5 also incorporates a digital to analog converter (DAC). The voice or touch tone analog data, after conversion to digital format by ADC 5, is then compressed conventionally by compressor/expander 6 and then transmitted to central processor unit (CPU) 7. Preferably, each of discrete components 3, 4, 5, and 6, can be implemented by means of a single subsystem, such as the model D41-B ADC/DAC Phone Line Interface, manufactured by Dialogic Corporation of Persippany, N.J. Each such subsystem will include four (4) telephone ports 14. If, as in the preferred embodiment, an Intel Corporation 80386 Processor is used as CPU 7, running the Concurrent DOS Operating System Software sold by Digital Research Corporation of Monterey, Calif., up to thirty-two (32) telephone ports 14 (using eight of model D41-B) can be accommodated.

Also linked to CPU 7 in this embodiment are four (4) MB (minimum) of random access memory (RAM) 9, data/clock chip 8 for stamping incoming data packets, and a conventional monitor/ keyboard terminal combination 20. Floppy disk 11 (with controller) is used for modification of the application software. Hard disk and controller unit 12 is used for program storage, data storage, and digital storage of pre-recorded voice data. This voice data, when accessed by CPU 7, is then expanded and converted to analog voice signals by components 6 and 5, respectively. Preferably, the ADC and DAC functions are accomplished using conventional adaptive differential pulse coded modulation (ADPCM) techniques with a sampling rate of 4,000 to 8,000 cycles per second and resolution of 8 bits of information. Hard disk unit 12 preferably will have at least 140 megabytes of storage and a maximum access time of 20 milliseconds.

Data is transmitted between VRU 2 and CEU 20 (FIG. 2) by means of serial link 13, which preferably is a standard RS-232 interface well known in the art, capable of transmitting asynchronously at 9600 baud. As seen on FIG. 2, CEU 20 will preferably include CPU 21 with 12 megabytes RAM 22, keyboard/monitor unit 23, disk storage unit 24 (840 megabytes typical), and at least one auxiliary tape storage drive 25 for transaction data input and backup purposes, and printer 26. Communication PC and modem combination 34 is used for phone network transmission of bank client transaction data independent of the PIN selection procedure. For efficient operation, CEU 20 will incorporate at least two conventional card encoding/ embossing machines 27 and 28 which are controlled by CPU 21 and linked by serial ports 33 through monitor/keyboard terminals 29 and 30. Additional terminal 31 links CPU 21 to printer 32 which is used for printing standard system operations and error messages. Again, the hardware is not type or vendor critical, and a variety of acceptable components are readily available and well known in the art.

It is known that the encoding/embossing machines 27 and 28 can be DataCard Models 430 or 450, manufactured by DataCard Corporation of Minneapolis, Minn. These machines are capable of receiving data and commands directly from CPU 21.

Figure 3:
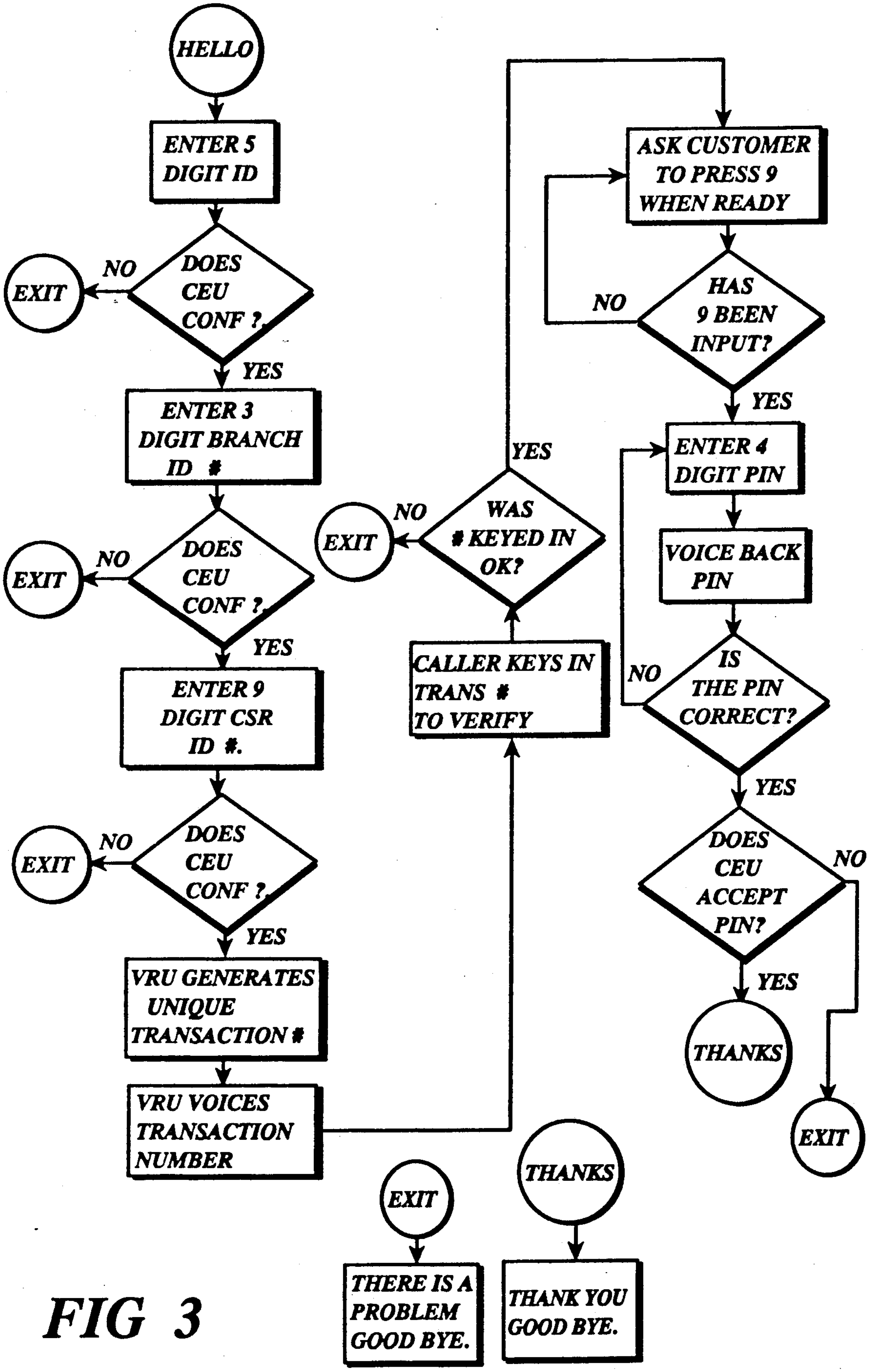
FIG. 3 is a flow chart of the steps involved in acquiring, storing, and confirming the ATM card PIN and related data by the system.
Figure 5:
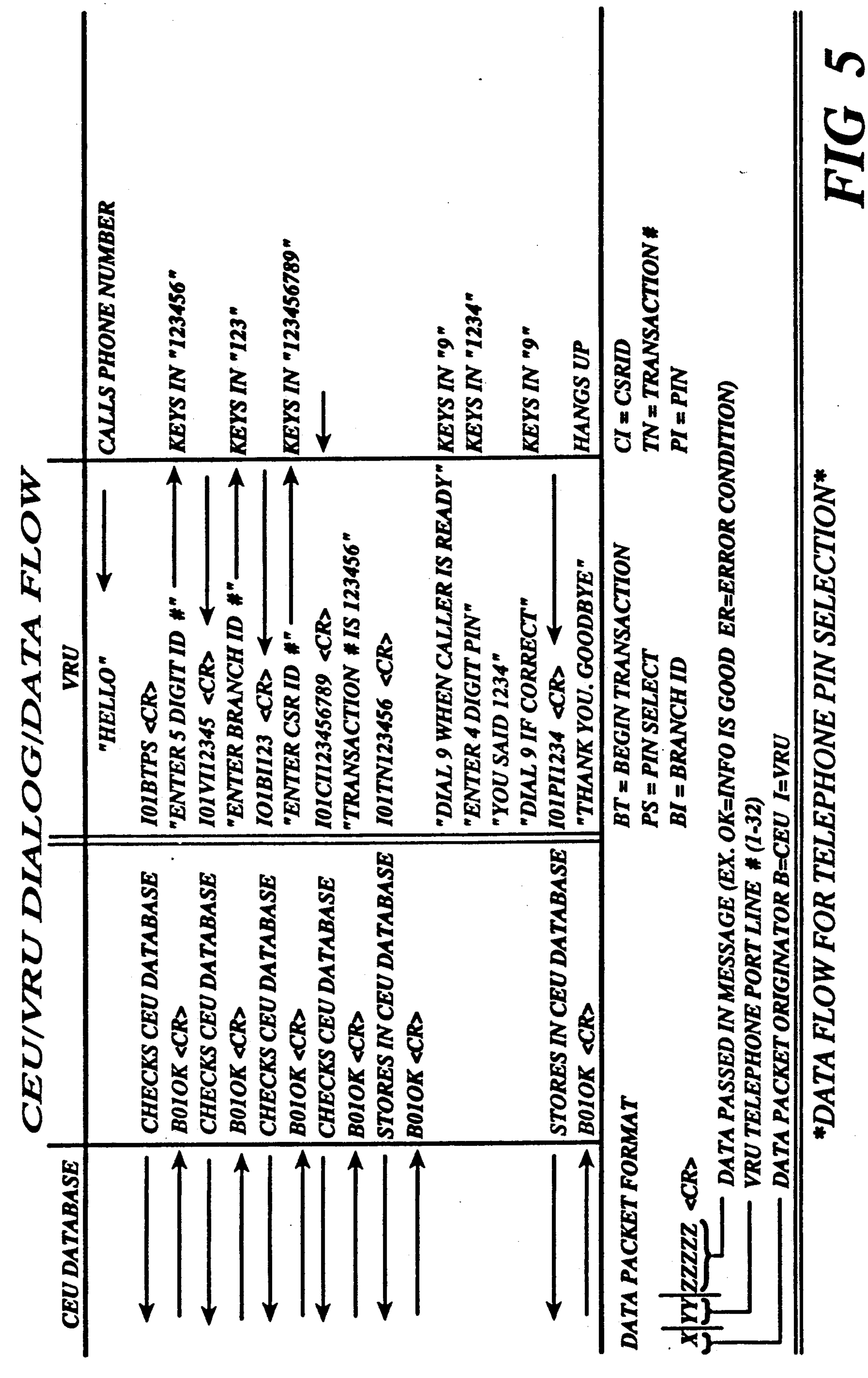
FIG. 5 is a chart showing the sequence and organization of voice inquiries, responses and data transfers among the telephone caller, voice response unit (VRU) and card encoding/embossing unit (CEU).

Turning to FIG. 3 and FIG. 5, the sequence of steps associated with initial data inquiry, acquisition, and confirmation are set forth. In the typical scenario, after the bank's customer service representative records the information necessary to open the ATM accessed bank account, a call is placed to VRU 2 at the ATM card facility. After VRU 2 generated voice answers the call, CEU 21 is accessed to advise that a transaction is to begin and to confirm that CEU 20 is prepared to interact accordingly. In the next three steps, VRU 2 voice prompts the customer service representative to enter by use of touch tone keys, numeric information identifying the bank client, the branch, and the customer service representative. After each response, VRU 2 confirms with CEU 20 that such data is valid. Optionally, client bank data necessary to make such confirmations could be stored directly on VRU 2. VRU 2 then generates a transaction number which is unique to this particular call and which is voice delivered to the customer service representative. The representative is voice prompted to key in and thereby confirm accurate receipt of the transaction number. At this point, the caller is prompted to place the bank's customer on the line for purposes of keying in the desired PIN. Once the PIN has been selected and voice confirmed to the customer, the call is terminated by VRU 2, and the entire transaction data is stored by VRU 2 and/or CEU 20, depending On the desires of the system user.

Figure 4:
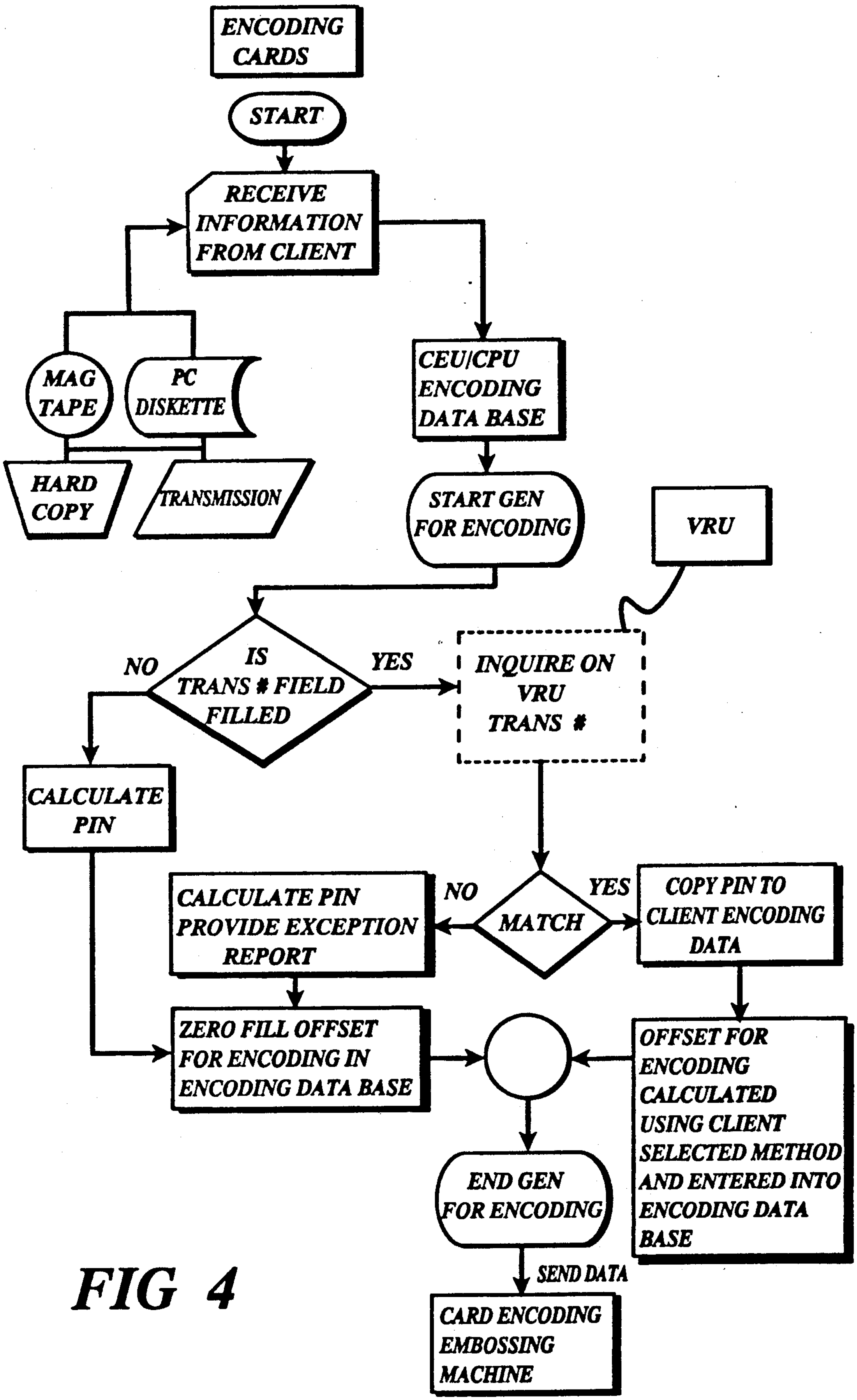
FIG. 4 is a flow chart of the steps involved in matching, generating, and encoding the PIN offset and related data.
Figure 6:
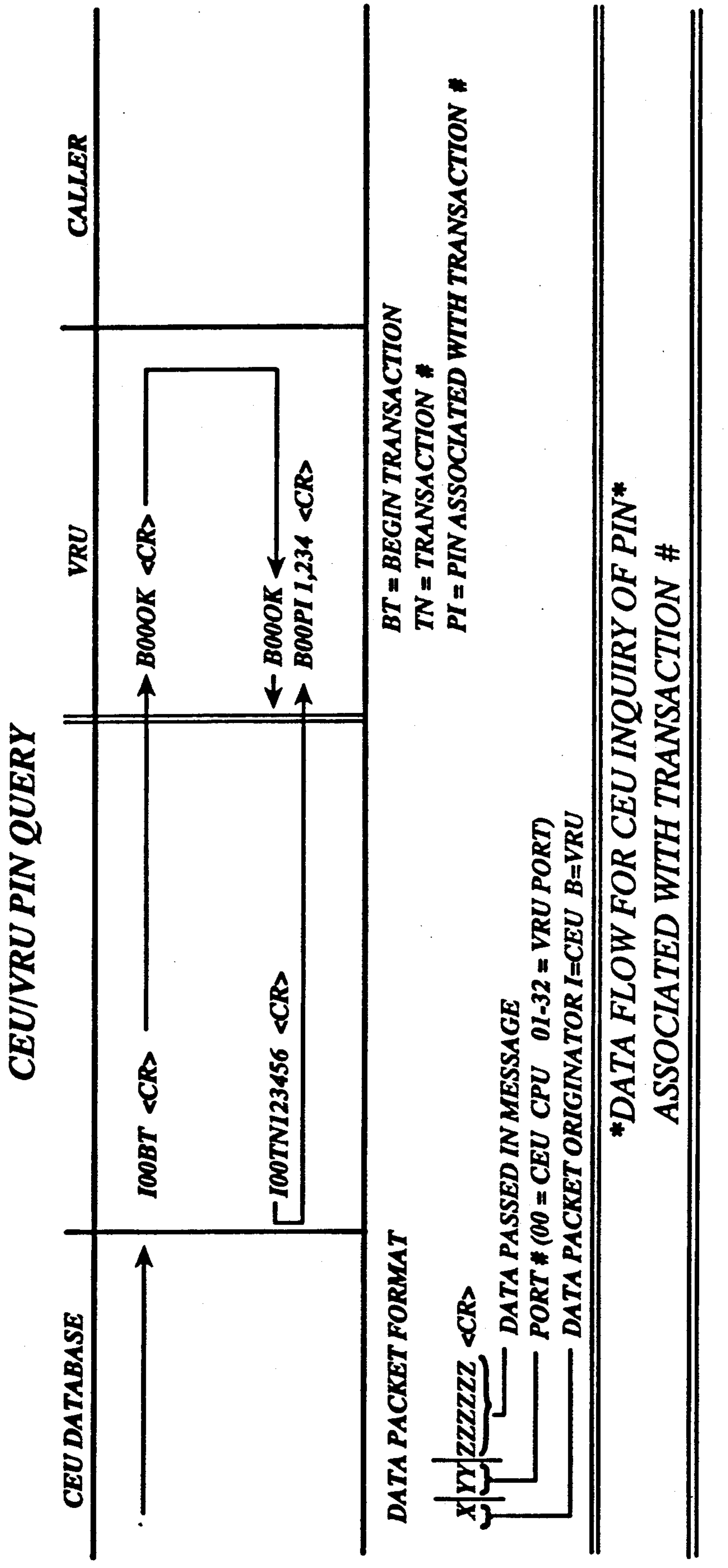
FIG. 6 is a chart showing the sequence and organization of data transfers between the VRU and CEU during the transaction number match and PIN locate routine portions of the method.

Looking now at FIGS. 4 and 6, the next sequence of steps of the preferred method are set forth. After some varying interval of time following the initial call to VRU 2, Transaction Data is received directly from the bank client by the ATM card issuing facility, including the transaction number which has previously bee generated and confirmed to the customer service representative by VRU 2. This data will also include other information necessary to open the ATM accessed bank account. The transaction data can be delivered in digital form either in hard copy, by direct computer-to-computer link, magnetic tape, diskette, et cetera. This Transaction Data is then combined with the preexisting Client Data Base in CEU 20 for purposes of generating the Initial Encoding Data to be entered into the Encoding Data Base.

Next, the encoding process starts, and each record of Initial Encoding Data in the Encoding Data Base is checked to see if the transaction number field is filled. If the transaction number is available, referring to FIG. 6, a transaction number match routine is performed between CEU 20 and VRU 2. If a match is found for the transaction number, the PIN associated with that transaction number is then transmitted by VRU 2 to CEU 20. This PIN is then used by CPU 21 of CEU 20 to generate a PIN offset using a proprietary encryption algorithm specified by the bank client. The use of such an offset algorithm is well known in the art. The calculated PIN offset is then entered into the Encoding Data Base. Finally, the Encoding Data Base is transmitted to encoding/embossing machines 27 and 28 where the appropriate data is embossed on the ATM card and magnetically encoded on the ATM card stripe. If, earlier in the sequence of steps, it is learned that the transaction number field is not filled or that there is no transaction number match with data stored by VRU 2, the method can be programmed either to terminate the process and generate an exception report or instruct CPU 21 to algorithmically calculate a PIN and PIN offset for use in encoding the ATM card. Obviously, obviously, at the completion of the embossing and encoding step, the cards are physically mailed to the bank client's customers.

It should be noted that the form, sequence, or amount of data transmitted during execution of the method can vary without necessarily departing from the spirit and scope of the invention claimed herein. Similarly, by selection of the appropriate hardware, it would be possible to combine some of the functions disclosed herein as being separately performed by CPU 7 and CPU 21. Further, the typical system disclosed herein would be enhanced by the addition of hardware and software necessary to allow the ATM card issuing facility to perform updates on the Client Data Base and other general system utilities.

Finally, it will be apparent to those skilled in the art that the system and method described and claimed herein will be applicable to the credit/debit card industry in general and useful to financial institutions of all types. Therefore, references in the disclosure and claims to ATM cards and machines and to banking institutions are for convenience and are not intended to limit the scope or application of the claimed invention.

What is claimed is:

1. A system for acquiring and encoding data needed to issue an ATM card, using a standard telephone network comprising:

a. telephone network interface means;

b. means, electrically linked to said telephone network interface means, for performing analog to digital and digital to analog data conversion;

c. means for storing digital data;

d. computer processor means linking said data conversion means to said data storage means;

e. said processor means further adapted for executing and processing, in conjunction with said data conversion and data storage means, a sequence of data acquisition, storage, and transmission steps including generation of voice inquiries over said telephone network, receiving of and converting analog response data, and digital storage of said converted analog response data; and f. means, operatively connected to said processor means, for encoding said digitally stored analog response data on an ATM card at the time of issue of said card.

2. The system of claim 1 further comprising computer processor means for algorithmically calculating from an ATM card customer selected PIN portion of said converted analog response data, PIN offset data for encoding on said ATM card.

3. The system of claim 1 where said telephone network interface means, said data conversion means, and said computer processor means are adapted for concurrent processing of analog response data from a plurality of telephone ports.

4. The system of claim 1 further comprising:

a. means adapted for receipt by said processor means of digital transaction data from an ATM client financial institution independently of said telephone network and analog to digital conversion means;

b. means linked to said transaction data receipt means for processing and storing said transaction data; and c. processor means for comparing portions of said transaction data with portions of said stored converted analog response data.

5. The system of claim 4 where said processor means linked to said data conversion means and said processor means linked to said transaction data receipt means each comprise independent computer central processor units in combination with random access memory.

6. The system of claim 1 where said data conversion means, said computer processor means, and said data storage means are adapted for converting, processing, and storing data using adaptive differential pulse code modulation techniques.

7. A method for acquiring and encoding ATM card data prior to card issue comprising the steps of:

a. computer processor generated voice prompting, over a conventional telephone network, of said ATM card data;

b. electrically receiving said prompted ATM card data, as transmitted over said telephone network in analog form;

c. electrically converting said receiving ATM card data from analog to digital format;

d. storing said converted data on computer processor controlled storage means;

e. electrically transmitting said converted ATM card data to means adapted for encoding said data on a conventional ATM card; and f. encoding said ATM card data.

8. A method for acquiring from a financial institution and encoding ATM card data prior to card issue comprising the steps of:

a. computer processor generated voice prompting, over a conventional telephone network, of said ATM card data;

b. electrically receiving said prompted ATM card data, as transmitted over said telephone network in analog form;

c. generating and voice prompting over said telephone network a transaction number unique to each ATM card data acquisition transaction;

d. electronically converting said received ATM card data from analog to digital format;

e. storing said converted data and said generated transaction number on first computer processor controlled storage means;

f. receiving from said financial institution digital transaction data associated with opening an ATM card account, said transaction data including said previously generated transaction number;

g. storing said digital transaction data on second computer processor controlled storage means;

h. comparing and matching said transaction numbers stored on said first storage means with transaction numbers on said second storage means;

i. combining said converted ATM card data from said first storage means with said matched transaction data from said second storage means;

j. electrically transmitting said combined converted ATM card and transaction data to means adapted for encoding said data on a conventional ATM card; and l. encoding said ATM data.

9. The method of claim 7 further comprising the steps of:

a. computer processor generated voice confirming of said prompted ATM card data over said telephone network.

10. A method for acquiring and encoding ATM card PIN data prior to card issue using a conventional telephone network comprising the steps of:

a. computer processor generated voice prompting over said network of data identifying the entity initiating the ATM card PIN selection transaction;

b. electrically receiving said entity identification data as transmitted over said telephone network in analog form;

c. electronically converting said received identification data from analog to digital format;

d. storing said converted identification data on first computer processor controlled storage means;

e. generating a transaction number unique to said PIN selection transaction and transmitting said number over said telephone network by said computer processor generated voice;

f. storing said generated transaction number on said first computer processor controlled storage means in association with said previously stored identification data;

g. computer processor generated voice prompting over said telephone network of a preferred ATM card PIN;

h. electrically receiving said prompted PIN as transmitted over said telephone network in analog form;

i. electronically converting said PIN from analog to digital format;

j. storing said converted PIN on said first computer processor controlled storage means in association with said previously stored identification data and said previously stored transaction number;

k. receiving from said transaction initiating entity digital transaction data associated with opening of said ATM card account, said data including said transaction number previously delivered to said entity by computer processor generated voice;

l. storing said digital transaction data on second computer processor controlled storage means;

m. comparing said transaction number portion of said digital transaction data on said second computer processor controlled storage means with said transaction number stored on said first computer controlled storage means;

n. using said PIN associated with said transaction number matched on said first computer controlled storage means, calculate a PIN offset number using an algorithm unique to said PIN selection initiating entity;

o. electrically transmitting said calculated PIN offset and at least a portion of said transaction data to means adapted for encoding said offset and said data on a conventional ATM card; and p. encoding said ATM card with said offset and said data.

* * * * *